United States Patent
Yao et al.

(10) Patent No.: US 12,260,852 B2
(45) Date of Patent: Mar. 25, 2025

(54) METHOD OF TRAINING SPEECH RECOGNITION MODEL, ELECTRONIC DEVICE AND STORAGE MEDIUM

(71) Applicant: BEIJING XIAOMI MOBILE SOFTWARE CO., LTD., Beijing (CN)

(72) Inventors: Zengwei Yao, Beijing (CN); Liyong Guo, Beijing (CN); Povey Daniel, Beijing (CN); Long Lin, Beijing (CN); Fangjun Kuang, Beijing (CN); Wei Kang, Beijing (CN); Mingshuang Luo, Beijing (CN); Quandong Wang, Beijing (CN); Yuxiang Kong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 292 days.

(21) Appl. No.: 18/078,460

(22) Filed: Dec. 9, 2022

(65) Prior Publication Data

US 2023/0386448 A1  Nov. 30, 2023

(30) Foreign Application Priority Data

May 31, 2022 (CN) .......................... 202210613726.7

(51) Int. Cl.
*G10L 15/06* (2013.01)
*G10L 15/16* (2006.01)
(Continued)

(52) U.S. Cl.
CPC ............ *G10L 15/063* (2013.01); *G10L 15/16* (2013.01); *G10L 15/22* (2013.01); *G10L 19/032* (2013.01); *G10L 2019/0002* (2013.01)

(58) Field of Classification Search
USPC ...................................................... 704/1–504
See application file for complete search history.

(56) References Cited

U.S. PATENT DOCUMENTS 11,875,809 B2 * 1/2024 Song ...................... G06N 3/047
2014/0006021 A1 * 1/2014 Kuropatwinski ..... G10L 15/063
704/235

(Continued)

FOREIGN PATENT DOCUMENTS

CN    112257858 A    1/2021
CN    113988267 A    1/2022
(Continued)

OTHER PUBLICATIONS

Gou, J. et al., "Knowledge distillation: A survey", arXiv:2006.05525v7, May 20, 2021, (36p).
(Continued)

*Primary Examiner* — Marcus T Riley
(74) *Attorney, Agent, or Firm* — Arch & Lake LLP

(57) ABSTRACT

A method of training a speech recognition model is provided. The method includes that: speech data of each of a plurality of training samples is inputted into a teacher model and a to-be-trained speech recognition model separately. Additionally, an embedding outputted by the teacher model and encoded data outputted by the to-be-trained speech recognition model are obtained. Furthermore, quantized codebook data is obtained by performing a multi-codebook quantization on the embedding. A loss is calculated based on the encoded data, the quantized codebook data, and text data in the training sample. Moreover, a trained speech recognition model is obtained by stopping training the to-be-trained speech recognition model when the loss is less than or equal to a preset loss threshold and/or trained times is greater than preset trained times.

20 Claims, 7 Drawing Sheets

(51) Int. Cl.
  *G10L 15/22* (2006.01)
  *G10L 19/00* (2013.01)
  *G10L 19/032* (2013.01)

(56) References Cited

U.S. PATENT DOCUMENTS

2022/0108712 A1* 4/2022 Song .................. G10L 21/0208
2022/0130415 A1* 4/2022 Garrison ............... G10L 15/063
2023/0386448 A1* 11/2023 Yao ........................ G10L 15/22

FOREIGN PATENT DOCUMENTS

CN      114298287 A     4/2022
CN      114359649 A     4/2022

OTHER PUBLICATIONS

Hinton, G. et al., "Distilling the knowledge in a neural network", arXiv:1503.02531v1, Mar. 9, 2015, (9p).
Zhang, Y. et al., "Deep mutual learning", arXiv:1706.00384v1, Jun. 1, 2017, (10p).
Li Yuan et al., "Revisit knowledge distillation: a teacher-free framework", (15p).
Baevski, A. et al., "wav2vec 2.0: A framework for self-supervised learning of speech representations", arXiv:2006.11477v2, Sep. 22, 2020, (19p).
Hsu, W. N. et al., "Hubert: Self-supervised speech representation learning by masked prediction of hidden units", arXiv:2106.07447v1, Jun. 14, 2021, (10p).
K-means clustering—Wikipedia, (17p).
Ondel, L..et al., "Variational inference for acoustic unit discovery", Procedia Computer Science, 81, 80-86, May 9-12, 2016, (7p).
Zhang Yanyong et al., "Multi-Modality Fusion Perception and Computing in Autonomous Driving", DOI: 10.7544/issn1000-1239.2020.20200255, Journal of Computer Research and Development, 57 (9): 1781-1799, 2020, (19p).
European Patent Office, Extended European Search Report Issued in Application No. 22217180.3, dated on Oct. 13, 2023, Germany, (9p).
Liyong Guo et al: "Predicting Multi-Codebook Vector Quantization Indexes for Knowledge Distillation", XPO91356773, Library Cornell University Ithaca, NY 14853, dated on Oct. 31, 2022 , (5p).
Raphael Shu et al: "Compressing Word Embeddings via Deep Compositional Code Learning", XP080834075, arxiv.org, Cornell University Library,201 Olinlibrary Cornell University Ithaca, NY 14853, dated on Nov. 3, 2017, (13p).
Rupak Vignesh Swaminathan et al: "CoDERT: Distilling Encoder Representations with Co-learning for Transducer-based Speech Recognition", XP081989556, arxiv.org, Cornell University Library, 201 Olinlibrary Cornell University Ithaca, NY 14853, dated on Jun. 14, 2021,(5p).
Geoffrey Hinton et al: "Distilling the Knowledge in a Neural Network", XP055549014, vol. 1503.02531v1, dated on Mar. 9, 2015, (9p).

* cited by examiner

METHOD OF TRAINING SPEECH RECOGNITION MODEL, ELECTRONIC DEVICE AND STORAGE MEDIUM

CROSS REFERENCE TO RELATED APPLICATION

The present application is based on and claims priority to Chinese patent application 202210613726.7 filed on May 31, 2022, the entire content of which is incorporated herein by reference for all purposes.

TECHNICAL FIELD

The present disclosure relates to the technical field of data processing, and in particular, to a method of training a speech recognition model, and an electronic device and a storage medium.

BACKGROUND

Knowledge distillation means to distill a representation capability learned by a larger-scale model onto a smaller model, so that the smaller model may become available to practical downstream tasks or be deployed on devices with limited computing resources, thus being widely applied in fields such as a computer vision, a natural language processing, and a speech processing.

Taking a teacher-student learning included in the knowledge distillation approach as an example, a teacher model usually has a large number of parameters and has a strong representation capability, while a student model has a small number of parameters and a limited representation capability. A core task of the teacher-student learning is to choose and define the appropriate teacher and student models, and design an effective distillation approach, so that the representation capability of the student model may be close to that of the teacher model.

However, when embeddings of the teacher model are distilled onto the student model in related arts, it needs to store the embeddings which results a large storage spaces occupied; alternatively, it needs to dynamically generate the embeddings for being used directly, which consumes a lot of computing powers for training and has a high demanding on a training device.

SUMMARY

The present disclosure provides a method and an apparatus for training a speech recognition model, and an electronic device and a storage medium, so as to solve the deficiencies of the related arts.

According to a first aspect of the present disclosure, a method of training a speech recognition model is provided, including: for each of a plurality of training samples, inputting speech data of the training sample into a teacher model and a to-be-trained speech recognition model separately, obtaining an embedding outputted by the teacher model and encoded data outputted by the to-be-trained speech recognition model, where the embedding includes a floating-point vector holding D floating-point numbers, obtaining quantized codebook data by performing a multi-codebook quantization on the embedding, where the quantized codebook data includes N integers corresponding to the speech data and each integer indicates a codebook index, where N is a positive integer, calculating a loss based on the encoded data, the quantized codebook data, and text data in the training sample, and obtaining a trained speech recognition model by stopping training the to-be-trained speech recognition model in response to determining at least one of followings: the loss being less than or equal to a preset loss threshold, or trained times being greater than preset trained times.

According to a second aspect of the present disclosure, an electronic device is provided, including: a memory and one or more processors.

The memory is configured to store a computer program executable by the one or more processors; and the one or more processors are configured to execute a computer program in the memory to implement the methods as described above.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
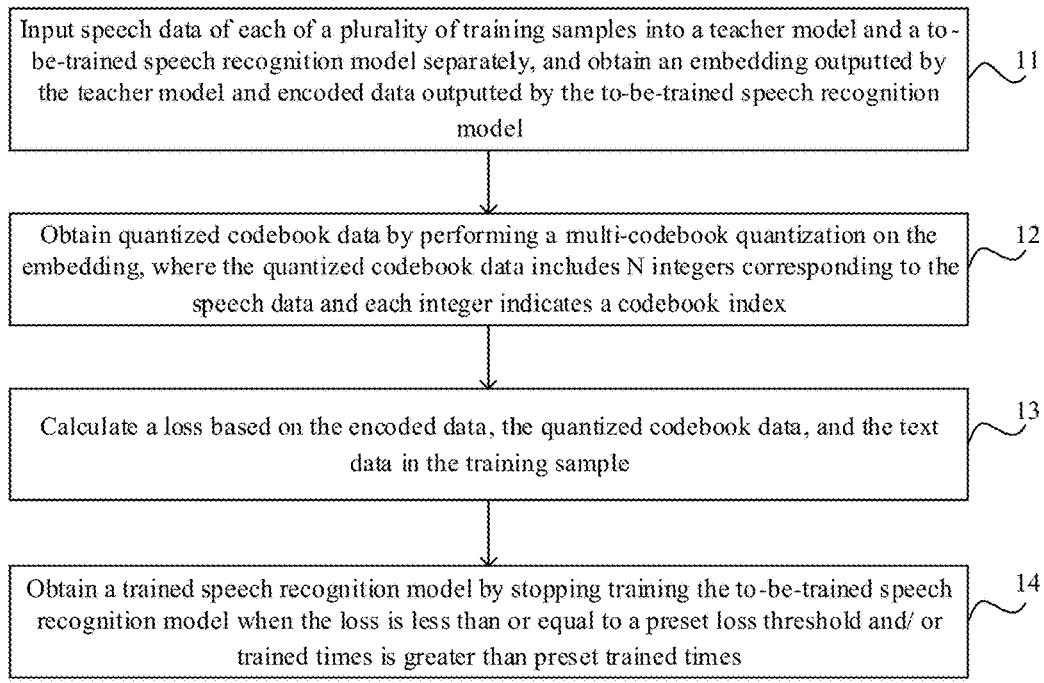
FIG. 1 illustrates a flowchart of a method of training a speech recognition model according to an example.

Embodiments will be described in detail here with the examples thereof illustrated in the drawings. Where the following descriptions involve the drawings, like numerals in different drawings refer to like or similar elements unless otherwise indicated. The illustratively described examples below are not intended to represent all examples consistent with the present disclosure. Rather, they are merely examples of apparatuses and methods consistent with some aspects of the present disclosure as detailed in the appended claims. It should be noted that the features in the following examples and implementations may be combined with each other without conflict.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

For making it convenient for those skilled in the art to understand, multiple implementation modes are listed in the embodiments of the disclosure to describe the technical solutions of the embodiments of the disclosure clearly. Of course, those skilled in the art can understood that multiple embodiments provided in the embodiments of the disclosure can be executed independently, or can be combined with methods of the other embodiments in the embodiments of the disclosure for execution together, or may be executed independently or after combined with some methods in other related technologies. No limits are made thereto in the embodiments of the disclosure.

Knowledge distillation means to distill a representation capability learned by a larger-scale model onto a smaller model, so that the smaller model may become available to practical downstream tasks or be deployed on devices with limited computing resources, thus being widely applied in fields such as a computer vision, a natural language processing, and a speech processing.

Taking a teacher-student learning included in the knowledge distillation approach as an example, a teacher model usually has a large number of parameters and has a strong representation capability, while a student model has a small number of parameters and a limited representation capability. A core task of the teacher-student learning is to choose and define the appropriate teacher and student models, and design an effective distillation approach, so that the representation capability of the student model may be close to that of the teacher model.

However, when embeddings of the teacher model are distilled onto the student model in related arts, it needs to store the embeddings, which results a large storage spaces occupied; alternatively, it needs to dynamically generate the embeddings for being used directly, which consumes a lot of computing powers for training and has a high demanding on a training device.

In order to solve the above technical problems, an example of the present disclosure provides a method of training a speech recognition model, which is applicable to an electronic device. As illustrated in FIG. 1, the method of training a speech recognition model includes step 11 to step 14.

At step 11, speech data of each of a plurality of training samples is inputted into a teacher model and a to-be-trained speech recognition model separately, and an embedding outputted by the teacher model and encoded data outputted by the to-be-trained speech recognition model are obtained. The embedding includes a floating-point vector holding D floating-point numbers.

In the example, the electronic device may acquire a training sample set which may include the plurality of training samples. Each training sample includes the speech data and text data corresponding to the speech data. That is, in each training sample, the text data is in one-to-one correspondence with the speech data, or the speech data is formed by reciting the text data aloud.

In the example, the electronic device may store the preset teacher model and the to-be-trained speech recognition model. The above speech recognition model is a student model. It should be understood that the number of the parameters of the teacher model is larger than that of the student model. Through the knowledge distillation, the representation capability or a learning capability extracted from the teacher model may be utilized by the student model, so that at least a part of recognition capability of the teacher model can be owned by the student model.

In practice, the above teacher model may include but is not limited to a Wav2vec2.0 model or a HuBERT model, and the above student model may include but is not limited to a conformer model. Those skilled in the art may select an appropriate teacher model and an appropriate student model according to a specific scenario, and corresponding solutions are protected by the present disclosure. In subsequent examples, the teacher model adopts the HuBERT model and the student model adopts the conformer model to describe the training methods provided by the present disclosure.

In the example, the electronic device may read each training sample from the training sample set, and input the speech data of the training sample into the teacher model and the to-be-trained speech recognition model.

The teacher model may process the speech data of the above training samples to obtain embeddings. Each embedding is obtained by extracting the features of the speech data of the training sample for uniquely representing the speech data. The embedding includes a floating-point vector holding D floating-point numbers. In one example, D is 1280 when the teacher model is the HuBERT model. Thus, supposing that 50 frames of speech data are generated per hour, the storage space required for 1000-hour training sample set is up to 351 GB.

The to-be-trained speech recognition model processes the speech data to obtain the encoded data. The encoded data may include a floating-point vector holding D1 floating-point numbers, with D1 being less than D.

At step 12, quantized codebook data is obtained by performing a multi-codebook quantization on the embedding. The quantized codebook data includes N integers corresponding to the speech data and each integer indicates a codebook index. N is a positive integer and is less than D.

Figure 2:
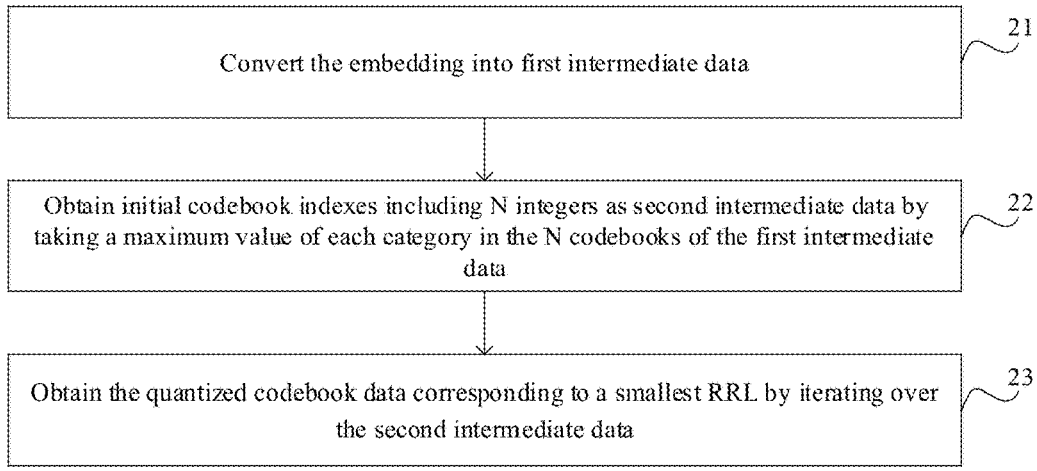
FIG. 2 illustrates a flowchart of performing a multi-codebook quantization on an embedding according to an example.

In the example, the electronic device may perform the multi-codebook quantization on the embedding to obtain the quantized codebook data. As illustrated in FIG. 2, step 21 to step 23 are included.

At step 21, the electronic device may convert the embedding into first intermediate data.

In one example, the electronic device may store a matrix module in an N*D*C dimension, so as to convert the above D-order embedding into the first intermediate data whose dimension is N*C. The first intermediate data includes N*C integers, with N indicating a number of codebooks, and C indicating a number of categories included in each codebook. For example, one codebook may be regarded as one k-means clustering center, and each codebook has a codebook index. In the codebook, each element (i.e., a category) may be regarded as a position of one clustering center. The positions of the cluster centers are taken as category indexes (or element indexes).

At step 22, the electronic device may obtain initial codebook indexes including N integers as second intermediate data by taking a maximum value of each category in the N codebooks of the first intermediate data.

In the example, the electronic device may obtain the second intermediate data by taking the position of the maximum value of each category in the first intermediate data as the value of the category, that is, taking the category index corresponding to the maximum value. It should be understood that the second intermediate data includes N codebooks, and each codebook has C categories, and the value of each category is the category index corresponding to its maximum value. In other words, in this step, the first intermediate data is initialized. For the convenience of description, the value corresponding to each category is subsequently set as an initial value.

At step 23, the electronic device may obtain the quantized codebook data corresponding to a smallest relative reconstruction loss (RRL) by iterating over the second intermediate data. The above iterating procedure is essentially an iterative search, so that a process of optimizing the value of each codebook is a process of searching for a global optimal result, which can avoid the influence of taking a local optimal result as the global optimal result.

Figure 3:
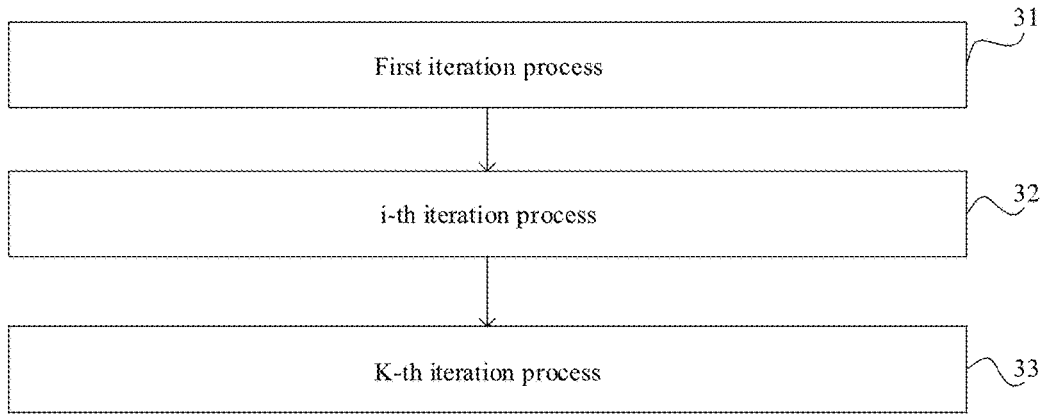
FIG. 3 illustrates a flowchart of obtaining quantized codebook data by iterating over second intermediate data according to an example.

In one example, each step in the iterating procedure has the same design, except that the values of some parameters are different in the first iteration process and the last iteration process. For the convenience of description, the above iterating procedure is divided into three stages in this step. As illustrated in FIG. 3, the procedure of iterating over the second intermediate data by the electronic device includes step 31 to step 33.

At step 31, in a first iteration process, the electronic device may combine the N codebooks of the first intermediate data in pairs according to an index order (of the codebooks) to obtain $N/2^1$ Level-1 codebook combinations. Each of the Level-1 codebook combinations includes C*C Level-1 element combinations, and each Level-1 element combination includes $2^1$ members. For each Level-1 codebook combination, the electronic device may obtain an RRL of each Level-1 element combination (i.e., C*C RRLs in total) and the initial codebook indexes of the remaining codebooks in the second intermediate data, and take L Level-1 element combinations corresponding to the smallest L RRLs of the C*C RRLs as the elements of the Level-1 codebook combination. The way of calculating the RRL may make reference to the following Formula (1), which will not be described here.

Taking N being 16 and C being 256 as an example, the electronic device may combine Codebook 1 and Codebook 2 into the first Level-1 codebook combination, Codebook 3 and Codebook 4 into the second Level-1 codebook combination, Codebook 5 and Codebook 6 into the third Level-1 codebook combination, Codebook 7 and Codebook 8 into the fourth Level-1 codebook combination, Codebook 9 and Codebook 10 into the fifth Level-1 codebook combination, Codebook 11 and Codebook 12 into the sixth Level-1 codebook combination, Codebook 13 and Codebook 14 into the seventh Level-1 codebook combination, and Codebook 15 and Codebook 16 into the eighth Level-1 codebook combination. Thus, there are eight Level-1 codebook combinations in total. In the above eight Level-1 codebook combinations, each includes a total of 256*256 Level-1 element combinations.

Then, the electronic device may perform the following processing on the eight Level-1 codebook combinations. Taking the first Level-1 codebook combination as an example, since the second intermediate data has a total of sixteen integers, except for the integers corresponding to the first Level-1 codebook combination (Codebook 1 and Codebook 2), the second intermediate data includes fourteen remaining codebooks (i.e., Codebook 3 to Codebook 16). The above remaining codebooks all take the initial codebook indexes, so that there is only one element combination corresponding to the remaining codebooks.

The electronic device may obtain the RRLs of the first Level-1 codebook combination and the initial codebook indexes of the remaining codebooks, that is, the electronic device obtains the RRL of each Level-1 element combination in the first Level-1 codebook combination (including a total of C*C element combinations) together with only one element combination corresponding to the above remaining codebooks, so as to obtain C*C RRLs.

Then, the electronic device may sort the above C*C RRLs in an ascending order (by, for example, a bubble sort algorithm or a tournament sorting algorithm), and take the L (e.g., 8) Level-1 element combinations corresponding to the smallest L RRLs of the C*C RRLs as the elements of the first Level-1 codebook combination after this iteration step.

Through the above search processing, each of the eight Level-1 codebook combinations includes 8 Level-1 element combinations. The number of Level-1 element combinations in each Level-1 codebook combination has been reduced from 256*256 to 8, representing a decrease of 65528, which accounts 99.9878 percent of the element combinations.

At step 32, in an i-th iteration process, the electronic device may combine Level-(i−1) codebook combinations in pairs in accordance with the index order (of the codebooks) to obtain $N/2^i$ Level-i codebook combinations, with each Level-i codebook combination including L*L Level-i element combinations, and each Level-i element combination includes $2^i$ members. For each Level-i codebook combination, the electronic device may obtain an RRL of each Level-i element combination (i.e., L*L RRLs in total) and the initial codebook indexes of the remaining codebooks in the second intermediate data, and take L Level-i element combinations corresponding to the smallest L RRLs of the L*L RRLs as the elements of the Level-i codebook combinations. The i is 1 to K−1, K indicates a total iteration number, and $2^K$ is equal to N.

Taking the i-th iteration process with i being 2 as an example, the electronic device may continue to combine eight Level-1 codebook combinations in pairs, that is, to combine the first Level-1 codebook combination and the second Level-1 codebook combination into the first Level-2 codebook combination, the third Level-1 codebook combination and the fourth Level-1 codebook combination into the second Level-2 codebook combination, the fifth Level-1 codebook combination and the sixth Level-1 codebook combination into the third Level-2 codebook combination, and the seventh Level-1 codebook combination and the eighth Level-1 codebook combination into the fourth Level-2 codebook combination. Thus, $(16/2^2=)4$ Level-2 codebook combinations are obtained in total.

In the above four Level-2 codebook combinations, each Level-2 codebook combination includes $L*L=8*8=64$ element combinations in total.

Then, the electronic device may perform the same processing on the four Level-2 codebook combinations. Taking the first Level-2 codebook combination as an example, since the second intermediate data has a total of sixteen integers, except for the integers corresponding to the first Level-2 codebook combination (Codebook 1, Codebook 2, Codebook 3, and Codebook 4), the second intermediate data includes twelve remaining codebooks (i.e., Codebook 5 to Codebook 16). The above remaining codebooks all take the initial codebook indexes, so that there is only one element combination corresponding to the remaining codebooks.

The electronic device may obtain the RRLs of the first Level-2 codebook combination and the initial codebook indexes of the remaining codebooks, that is, the electronic device obtains the RRL of each Level-2 element combination in the first Level-2 codebook combination (including a total of $L*L=8*8=64$ element combinations) together with only one element combination corresponding to the above remaining codebooks, so as to obtain $L*L=8*8=64$ RRLs.

Then, the electronic device may sort the $L*L=8*8=64$ RRLs in an ascending order, and take the L (e.g., 8) Level-2 element combinations corresponding to the smallest L RRLs of the 64 RRLs as the elements of the first Level-2 codebook combination after this iteration step.

Through the above search processing, each of the four Level-2 codebook combinations includes eight Level-2 element combinations. The number of Level-2 element combinations in each Level-2 codebook combination has been reduced from 8*8 to 8, representing a decrease of 56, which accounts 87.5 percent of the element combinations.

Taking the i-th iteration process with i being 3 as an example, the electronic device may continue to combine the four Level-2 codebook combinations in pairs, that is, to combine the first Level-2 codebook combination and the second Level-2 codebook combination into the first Level-3 codebook combination, and the third Level-2 codebook combination and the fourth Level-2 codebook combination into the second Level-3 codebook combination. Thus, $(16/2^3=)2$ Level-3 codebook combinations are obtained in total.

In the above two Level-3 codebook combinations, each Level-3 codebook combination includes $L*L=8*8=64$ element combinations in total.

Then, the electronic device may perform the same processing on the two Level-3 codebook combinations. Taking the first Level-3 codebook combination as an example, since the second intermediate data has a total of sixteen integers, except for the integers corresponding to the first Level-3 codebook combination (Codebook 1 to Codebook 8), the second intermediate data includes eight remaining codebooks (i.e., Codebook 9 to Codebook 16). The above remaining codebooks all take the initial codebook indexes, so that there is only one element combination corresponding to the remaining codebooks.

The electronic device may obtain the RRLs of the first Level-3 codebook combination and the initial codebook indexes of the remaining codebooks, that is, the electronic device obtains the RRL of each Level-3 element combination in the first Level-3 codebook combination (including a total of $L*L=8*8=64$ element combinations) together with only one element combination corresponding to the above remaining codebooks, so as to obtain $L*L=8*8=64$ RRLs.

Then, the electronic device may sort the $L*L=8*8=64$ RRLs in an ascending order, and take the L (e.g., 8) Level-3 element combinations corresponding to the smallest L RRLs of the 64 RRLs as the elements of the first Level-3 codebook combination after this iteration step.

Through the above search processing, each of the two Level-3 codebook combinations includes eight Level-3 element combinations. The number of Level-3 element combinations in each Level-3 codebook combination has been reduced from 8*8 to 8, representing a decrease of 56, which accounts 87.5 percent of the element combinations.

It should be noted that the value of K is set to make $2^K$ equal to N, so that the codebook combination just covers all N codebooks in the last iteration process. Of course, N may also be set less than $2^K$, so long as all the codebooks are covered in the last iteration process, whose corresponding solution is protected by the present disclosure.

At step 33, in a K-th iteration process, the electronic device may combine Level-(K−1) codebook combinations in pairs in accordance with the index order (of the codebooks) to obtain a Level-K codebook combination including $L*L$ Level-K element combinations, obtain an RRL of each Level-K element combination in the Level-K codebook combination, and take the Level-K element combination with the smallest RRL as the quantized codebook data. Each Level-K element combination includes $2^K$ members.

In the example, the electronic device may calculate the RRL of each Level-K element combination in the Level-K codebook combination, and take the Level-K element combination with the smallest RRL as the above-mentioned quantized codebook data.

In the example, during the iteration processes from i=1 to i=K, the electronic device may gradually expand a search range. The search range is changed in turn to Codebooks 1-2, Codebooks 1-4, Codebooks 1-8, ... and Codebooks 1-2 K, while the element combinations in the code combinations in various levels are reduced in turn. Therefore, the selected element combinations are more in line with the search range, and finally the global optimal element combination is obtained.

In another example, a pre-trained codebook quantization model may be stored in the electronic device. Thus, the electronic device may input the embeddings into the pre-trained codebook quantization model. The codebook quantization model iterates over the second intermediate data, and the quantized codebook data corresponding to a smallest RRL outputted by the codebook quantization model is obtained.

Figure 4:
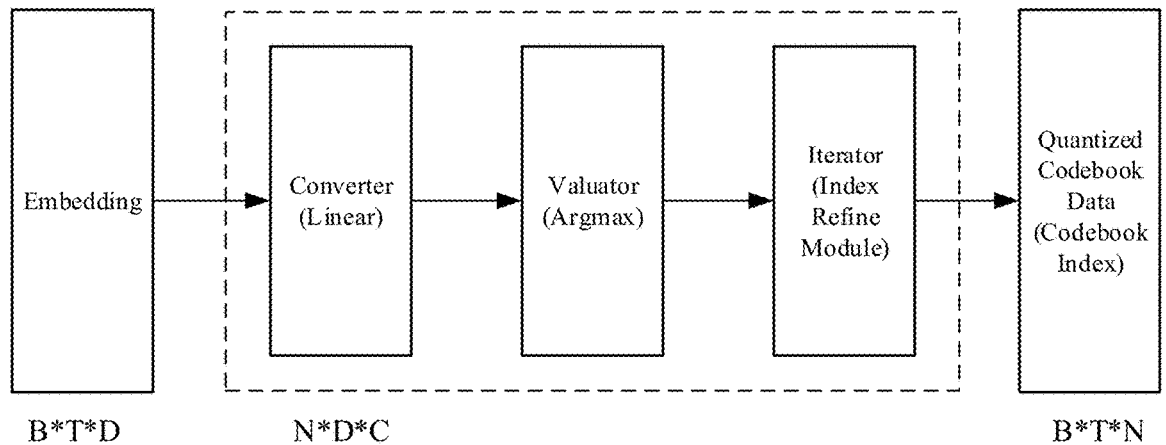
FIG. 4 illustrates a structural block diagram of a codebook quantization model according to an example.

In the example, the above-mentioned codebook quantization model may include a converter, a valuator, and an iterator for encoding the inputted floating-point vector into a set of integers. As illustrated in FIG. 4, an inputted dimension of the converter, Liner, is $B*T*D$, with B indicating a batch size, T indicating a time step (i.e., a number of frames), and D indicating a dimension of tensor. A parameter dimension of the converter, Liner, is $N*D*C$, and the dimension of the outputted data, i.e., the first intermediate data, is $N*C$, with C indicating a codebook size. The valuator, Argmax, may assign each category in the first intermediate data to a position where a maximum value is located, and output N integers as the second intermediate data in a $B*T*N$ dimension. The iterator, Index Refine Module, is configured to iterate over the above N integers to filter out a global optimal result, i.e., the quantized codebook data.

Figure 5:
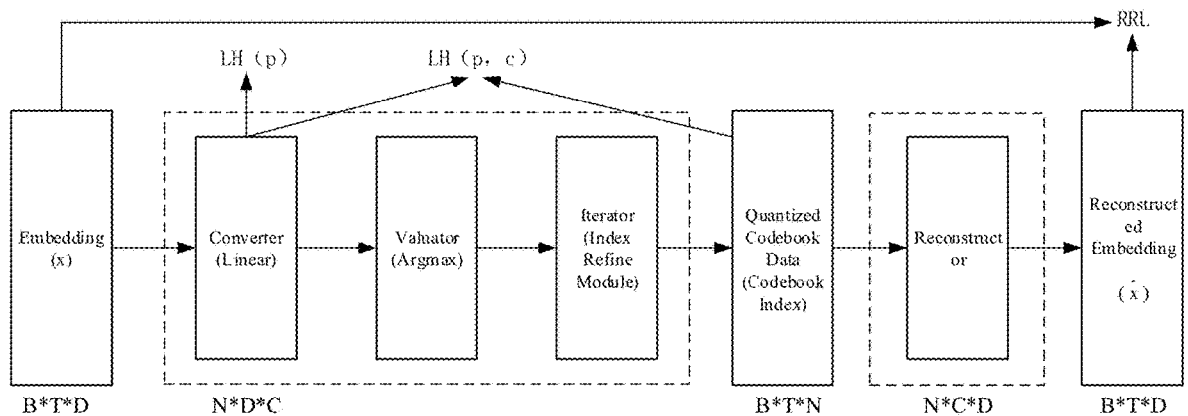
FIG. 5 illustrates a structural block diagram of training a codebook quantization model according to an example.

In order to facilitate training the pre-trained codebook quantization model, the example further provides a structure of training the codebook quantization model, as illustrated in FIG. 5, which further includes a quantized-data reconstruction model, Centers, as a decoder,. The input of the quantized-data reconstruction model, Centers, is the quantized codebook data, with its parameter dimension being N*C*D. The output of the decoder, Centers, is a reconstructed embedding, with its dimension being B*T*D. In addition, the structure illustrated in FIG. 5 also includes three losses, namely n uniform distribution loss LH(p), a consistency loss LH(p, c) and an RRL.

Figure 6:
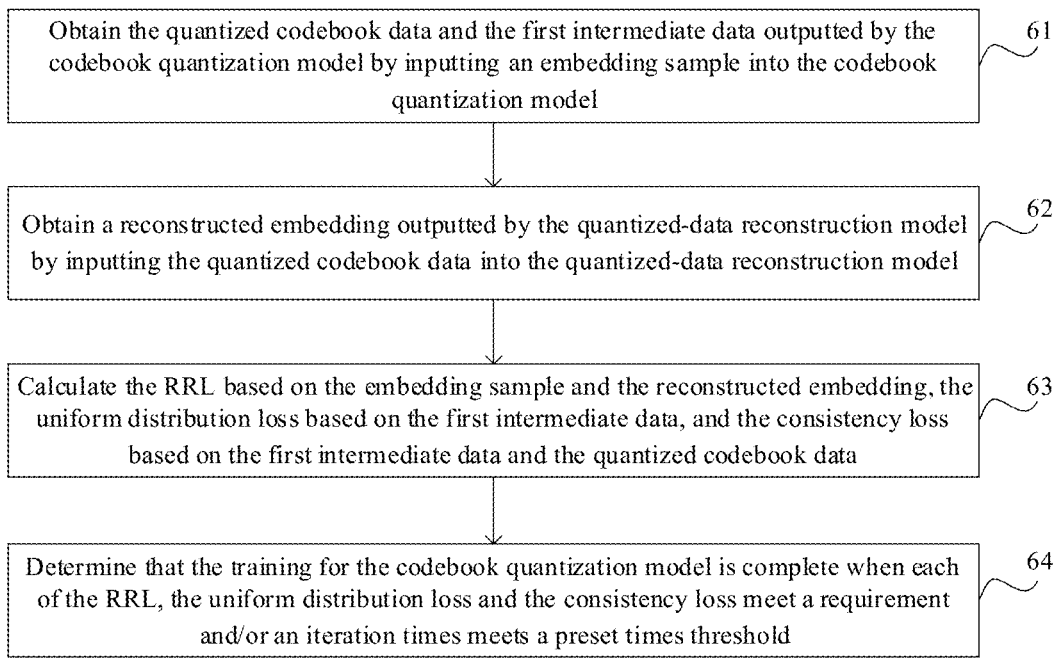
FIG. 6 illustrates a flowchart of a method of training a codebook quantization model according to an example.

In the example, as illustrated in FIG. 5, the codebook quantization model may be trained via the following steps, as illustrated in FIG. 6, including step 61 to step 64.

At step 61, the electronic device may obtain the quantized codebook data and the first intermediate data outputted by the codebook quantization model by inputting an embedding sample into the codebook quantization model.

At step 62, the electronic device may obtain the reconstructed embedding outputted by the quantized-data reconstruction model by inputting the quantized codebook data into the quantized-data reconstruction model.

At step 63, the electronic device may calculate the RRL based on the embedding sample and the reconstructed embedding, the uniform distribution loss based on the first intermediate data, and the consistency loss based on the first intermediate data and the quantized codebook data.

Figure 7:
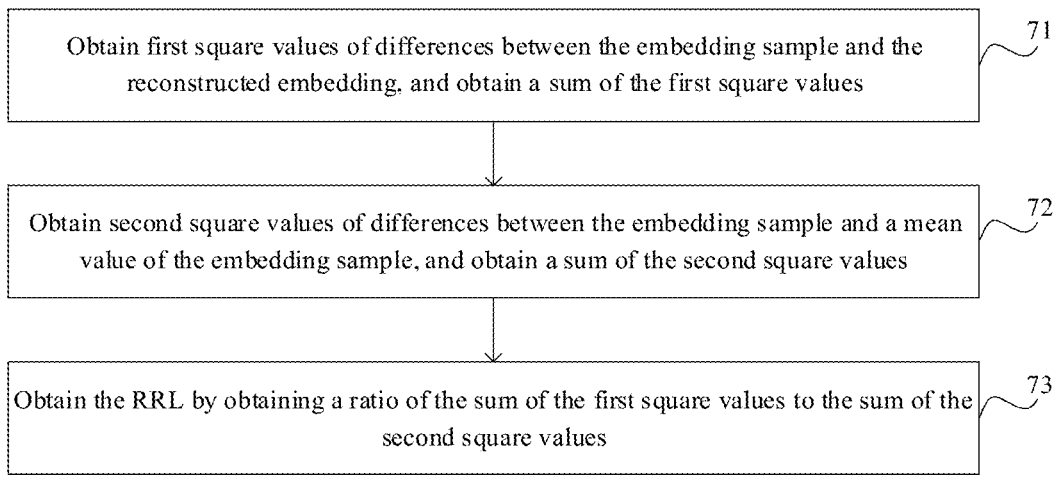
FIG. 7 illustrates a flowchart of obtaining a relative reconstruction loss (RRL) according to an example.

In this step 63, the electronic device may calculate the RRL based on the embedding sample and the reconstructed embedding, as illustrated in FIG. 7, including step 71 to step 73.

At step 71, the electronic device may obtain first square values of differences between the embedding sample and the reconstructed embedding, and obtain a sum of the first square values.

At step 72, the electronic device may obtain second square values of differences between the embedding sample and a mean value of the embedding sample, and obtain a sum of the second square values.

At step 73, the electronic device may obtain the RRL by obtaining a ratio of the sum of the first square values to the sum of the second square values.

In one example, the electronic device may also calculate the above-mentioned RRL by Formula (1):

$$RRL = \text{sum sq}(x, \hat{x}) / \text{sum sq}(x, x\_\text{meam})$$

In Formula (1), RRL indicates an relative reconstructed loss, sum indicating a summation operation, (x, x̂) indicates to calculate the differences of x, x̂, sp(x, x̂) indicates to calculate the square values of the differences of x, x̂, sq (x, x_meam) indicates, to calculate the square values of the difference of x, x_meam, x, x̂,mean indicates the embedding sample, the reconstructed embedding, and the mean value of the embedding (i.e., the mean value in different dimensions), respectively.

In the example, by calculating the RRL, it enables the reconstructed embedding as consistent as possible with the embedding sample, so as to ensure the accuracy of the recognition results of the speech recognition model.

Figure 8:
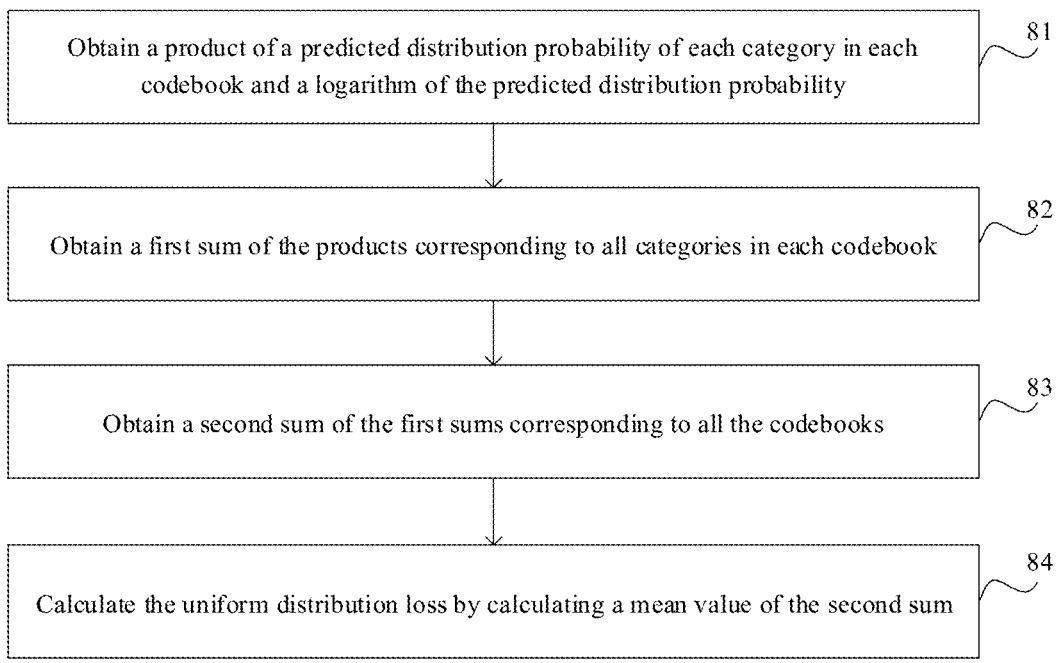
FIG. 8 illustrates a flowchart of obtaining a uniform distribution loss according to an example.

In this step 63, as illustrated in FIG. 5, the electronic device may also calculate the uniform distribution loss based on the first intermediate data, as illustrated in FIG. 8, including step 81 to step 84.

At step 81, the electronic device may obtain a product of a predicted distribution probability of each category in each codebook and a logarithm of the predicted distribution probability.

At step 82, the electronic device may obtain a first sum of the products corresponding to all categories in each codebook.

At step 83, the electronic device may obtain a second sum of the first sums corresponding to all the codebooks.

At step 84, the electronic device may calculate the uniform distribution loss by calculating a mean value of the second sum.

In one example, the electronic device may also calculate the above-mentioned uniform distribution loss by Formula (2):

$$LH(p) = \frac{1}{N}\sum_n^N \sum_c^C p_n[c] * \log(p_n[c])$$

In formula (2), p indicates the prediction probability, c indicates a category index in the quantized codebook data, n indicates a codebook index; $P_n[c]$ indicates the prediction probability corresponding to the category c in the codebook n.

In the example, by calculating the uniform distribution loss, it enables the N*C categories in the quantized codebook data to be uniformly distributed, so as to avoid the situation that some categories are always selected and the other categories are ignored.

Figure 9:
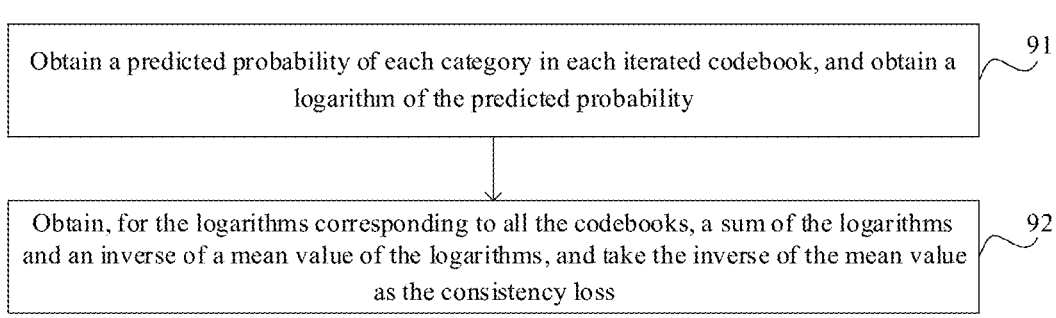
FIG. 9 illustrates a flowchart of obtaining a consistency loss according to an example.

In this step 63, as illustrated in FIG. 5, the electronic device may also calculate the consistency loss based on the first intermediate data and the quantized codebook data, as illustrated in FIG. 9, including step 91 to step 92.

At step 91, the electronic device may obtain a predicted probability of each category in each iterated codebook, and obtain a logarithm of the predicted probability;

At step 92, the electronic device may obtain, for the logarithms corresponding to all the codebooks, a sum of the logarithms and an inverse of a mean value of the logarithms, and take the inverse of the mean value as the consistency loss.

In one example, the electronic device may also calculate the above-mentioned consistency loss by Formula (3):

$$LH(p, c) = -\frac{1}{N}\sum_n^N \log(p_n[c_n])$$

In formula (3), p indicates the prediction probability, c indicates a category index in the quantized codebook data, n indicates a codebook index, $C_n$ indicates a category index in the codebook n in the quantized codebook data, and $P_n[c_n]$ indicates the predicted probability corresponding to $C_n$.

In the example, the function LH(p, c) is a categorical cross entropy for maximizing the predicted probability corresponding to the category selected after the iterator, i.e., making the output of the converter and the output of the iterator closer, so that the prediction result of the speech recognition model can predict the global optimal result.

At step 64, the electronic device may determine that the training for the codebook quantization model is complete when each of the RRL, the uniform distribution loss and the consistency loss meet a requirement and/or an iteration times meets a preset times threshold.

In this step, an RRL threshold, a uniform distribution loss threshold and a consistency loss threshold are stored in the electronic device. When the above RRL is less than or equal to the RRL threshold, the above uniform distribution loss is less than or equal to the uniform distribution loss threshold, and the above consistency loss is less than or equal to the consistency loss threshold at the same time, it may be determined that the requirement is met, and the electronic device may determine that the codebook quantization model completes its training. When any one of the three items, the above RRL being less than or equal to the RRL threshold, the above uniform distribution loss being less than or equal to the uniform distribution loss threshold, and the above consistency loss being less than or equal to the consistency loss threshold, is not satisfied, step 61 to step 64 are performed repeatedly until all three items are satisfied at the same time.

In this step, a preset times threshold is stored in the electronic device, such as 20,000 to 50,000 times. The iteration continues when the iteration times is less than or equal to the preset times threshold, and it is determined that the codebook quantization model has completed its training when the iteration times is greater than the preset times threshold.

In one example, the loss threshold scheme and the preset times threshold scheme may exist at the same time, and when at least one of the two schemes reach its standard, it is determined that the codebook quantization model completes the training.

At step 13, a loss is calculated based on the encoded data, the quantized codebook data, and the text data in the training sample.

In the example, the loss may include a categorical cross entropy (CE), a joint codebook loss ((JCL), and a Recurrent Neural Network Transducer (RNN-T) loss function value, which may be selected according to specific scenarios. In one example, two kinds of losses, the categorical cross entropy and the RNN-T loss function, are selected to train the speech recognition model.

Figure 10:
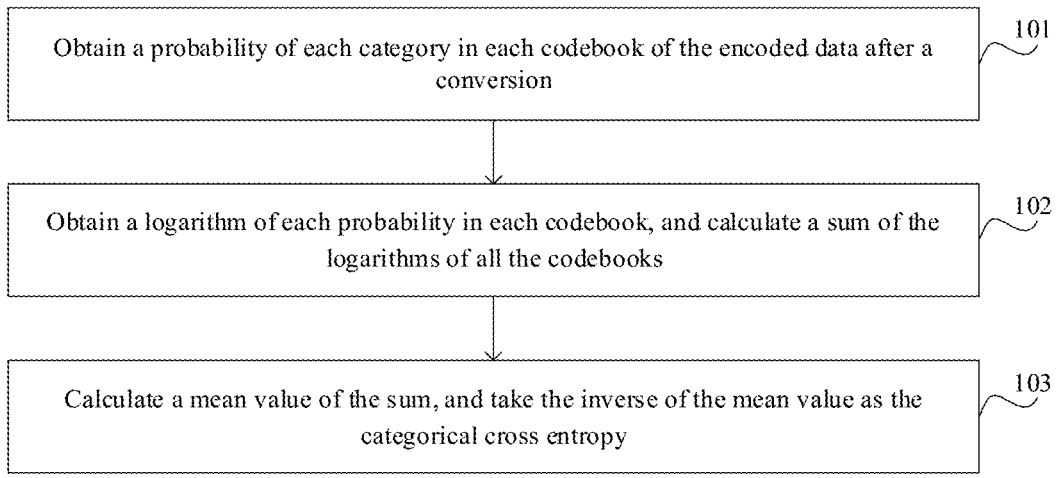
FIG. 10 illustrates a flowchart of obtaining a categorical cross entropy according to an example.

Taking the loss including the categorical cross entropy as an example, the electronic device may calculate the loss based on the encoded data, the quantized codebook data, and the text data in the training sample, as illustrated in FIG. 10, including step 101 to step 103.

At step 101, the electronic device may obtain a probability of each category in each codebook of the encoded data after a conversion.

At step 102, the electronic device may obtain a logarithm of each probability in each codebook, and calculate a sum of the logarithms corresponding to all the codebooks. That is, each category corresponds to a predicted probability, the logarithm of the predicted probability is calculated, and then the sum of the logarithms corresponding to all the categories of all the codebooks is obtained.

At step 103, the electronic device may calculate a mean value of the sum, and take the inverse of the mean value as the categorical cross entropy. That is, the electronic device may divide the above sum by (−N) to obtain the inverse of the mean value, so as to obtain the categorical cross entropy.

In one example, the electronic device may also calculate the above-mentioned categorical cross entropy by Formula (4):

$$CE(x, c) = -\frac{1}{N}\sum_{n}^{N}\log(p_n(x)[c_n])$$

In formula (4), x indicates the encoded data of the speech recognition model, c indicates the embedding outputted by the teacher model, $p_n(x)[c_n]$ indicates the probability of x corresponding to the category $c_n$ in the codebook n after the conversion.

In another example, the electronic device may also calculate a joint codebook loss by Formula (5):

$$p'_n(x)[c_n] = Lin\left(ReLU\left(Lin(x) + \sum_{1}^{n-1}Emb_i[c_i]\right)\right)$$

In Formula (5), $Emb_i[c_i]$ indicates that in the codebook i, the category ci is mapped to a learnable vector, Lin indicates a linear conversion function that may be learned, ReLU(x) =max(0, x) means to take the larger of 0 and x, and x indicates the encoded data of the speech recognition model.

The joint codebook loss function expressed by Formula (5) indicates that for predicting the categories of the codebook n, besides the encoded data x outputted by the speech recognition model, the information of one or more previous codebooks is utilized, that is, the current codebook is predicted via a regression of the one or more previous codebooks, which targets to make full use of a correlation between different codebooks, so as to predict the current codebook via the regression of the previous codebooks and improve an ability of extracting teacher information through the regression algorithm.

In another example, the above-described categorical cross entropy and the joint codebook loss coexist.

Figure 11:
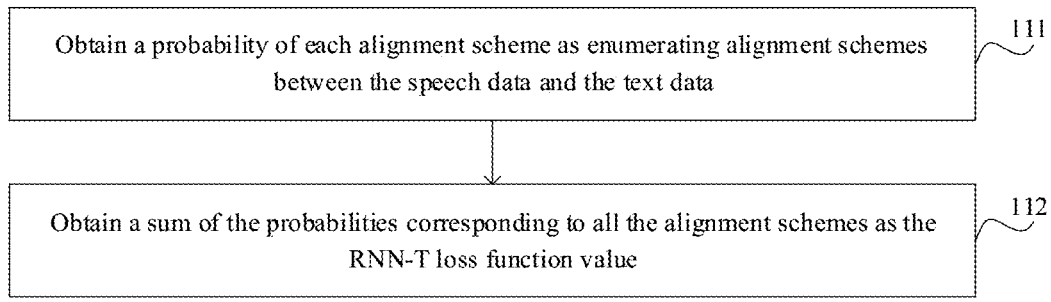
FIG. 11 illustrates a flowchart of obtaining an RRT-T loss function value according to an example.

Taking the loss including the RNN-T loss function value as an example, the electronic device may calculate the loss based on the encoded data, the quantized codebook data, and the text data in the training sample, as illustrated in FIG. 11, including step 111 to step 112.

At step 111, the electronic device may obtain a probability of each alignment scheme as enumerating alignment schemes between the speech data and the text data.

At step 112, the electronic device may obtain a sum of the probabilities corresponding to all the alignment schemes as the RNN-T loss function value.

In one example, the electronic device may also calculate the RNN-T loss function value by Formula (6):

$$Pr(y \mid x_1) = \sum_{\alpha \in \beta^{-1}(y)} Pr(\alpha \mid x_1)$$

In Formula (6), $\beta^{-1}(y)$ indicates all possible alignment scenarios between the speech data x1 and the text y, α indicates any one of the alignment scenarios, and $Pr(\alpha|x_1)$ indicates the predicted probability of the speech data with respect to the alignment scenario α, which is jointly modeled by an encoder and a predictor in the speech recognition model.

At step 14, a trained speech recognition model is obtained by stopping training the to-be-trained speech recognition model when the loss is less than or equal to a preset loss threshold, and/or trained times is greater than preset trained times.

In the example, a categorical cross entropy threshold and an RNN-T threshold are stored in the electronic device. When the categorical cross entropy is less than or equal to the categorical cross entropy threshold and the RNN-T loss function value is less than or equal to the RNN-T threshold, the electronic device may determine that the speech recognition model has completed its training, and obtain the trained speech recognition model. When one of the two items, the categorical cross entropy being less than or equal to the categorical cross entropy threshold and the RNN-T loss function value being less than or equal to the RNN-T threshold, is not satisfied, step 11 to step 14 are performed until both the items are satisfied. Alternatively or additionally, the electronic device stores a preset training times (for example, 30 to 3000 times). The training is stopped when the training times, i.e., the times of performing step 11 to step 14, is greater than the above preset training times. It continues to perform step 11 to step 14 when the training times is less than or equal to the above preset training times, until the training times is greater than the preset training times.

Thus, according to the solutions provided by the above examples of the present disclosure, the speech data of each of a plurality of training samples is inputted into the teacher model and the to-be-trained speech recognition model separately, the embedding outputted by the teacher model and the encoded data outputted by the to-be-trained speech recognition model are obtained with the embedding including a floating-point vector holding D floating-point numbers. Then, the quantized codebook data is obtained by performing the multi-codebook quantization on the embedding, in which the quantized codebook data includes N integers corresponding to the speech data and each integer indicates a codebook index. Thereafter, a loss is calculated based on the encoded data, the quantized codebook data, and the text data in the training sample. At last, the trained speech recognition model is obtained by stopping training the to-be-trained speech recognition model when the loss is less than or equal to a preset loss threshold and/or trained times is greater than preset trained times. Through converting the embedding into the quantized codebook data of integer type in the examples, the storage space required for the quantized codebook data is greatly reduced. Alternatively, through adopting the quantized codebook data instead of dynamically generating and directly applying the embedding, the required computing power can be reduced, so that the electronic device is not required to have larger storage space or higher computing power, thereby reducing the cost.

Figure 12:
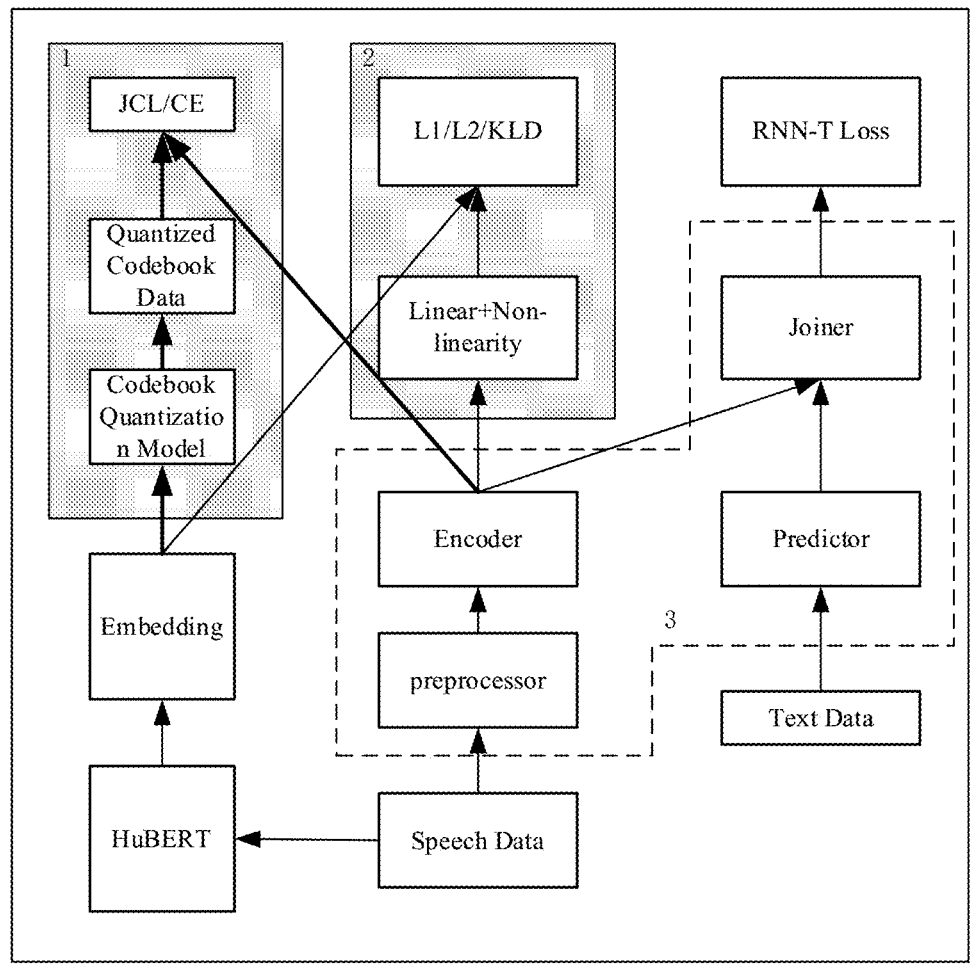
FIG. 12 illustrates a block diagram of an architecture of training a speech recognition model according to an example.

On the basis of the methods of training a speech recognition model provided by the examples of the present disclosure, an example of the present disclosure also provides an architecture for training a speech recognition model, as illustrated in FIG. 12, including the following modules.

A teacher model that is implemented by a HuBERT model, a codebook quantization model, a JCL/CE calculator, a speech recognition model, a dimension converter (Linear+Non-linearity), an L1/L2/KLD calculator, an RNN-T loss function value calculator. The above architecture may realize training the speech recognition model in two modes. The speech recognition model 3 includes a preprocessor, an encoder, a predictor and a joiner.

In a first mode, the part labeled by 1 (including the codebook quantization model, the quantized codebook data and the JCL/CE calculator) are removed and the other part is remained. Such the architecture may train the speech recognition model according to the related art. The training process includes is as follows.

(1) The speech data in a training sample is inputted into the HuBERT model, and the HuBERT model converts the speech data and outputs an embedding. The embedding is inputted into the L1/L2/KLD calculator.

(2) The speech data in the training sample is inputted into the speech recognition model. The preprocessor in the speech recognition model processes the above speech data and then inputs it into the encoder. The encoder outputs the encoded data (which may be regarded as an embedding whose parameter number is smaller than that of the embedding outputted by the teacher model). The encoded data is inputted into the dimension converter and after a conversion, inputted to the L1/L2/KLD calculator and the joiner.

Thus, the L1/L2/KLD calculator may calculate an L1 distance, an L2 distance or a divergence similarity, and compare them with the corresponding thresholds. When the L1 distance, the L2 distance or the divergence similarity are respectively less than or equal to the corresponding threshold, a loss requirement is met. However, when the L1 distance, the L2 distance or the divergence similarity is greater than the corresponding threshold, the loss requirement is not met.

(3) The text data in the training sample is inputted into the predictor of the speech recognition model. The predictor outputs predicted category data and outputs to the joiner. The joiner may join the encoded data and the preset category data and output them into the RNN-T loss function value calculator, and the RNN-T loss function calculator calculates the RNN-T loss. When the RNN-T loss is less than or equal to the RNN-T loss threshold, it is determined to meet the requirement; when the RNN-T loss is greater than the RNN-T loss threshold, it is determined that the requirement is not met.

(4) When both the L1/L2/KLD calculator and the RNN-T loss function value calculator meet the requirements and/or the iteration times reaches a preset times threshold (such as 30 rounds), it is determined that the training of the speech recognition model is completed; otherwise, it continues to input training samples and keep training until the training is complete.

In a second mode, the part labeled by 2 (including the dimension converter Linear+Non-linearity and the L1/L2/KLD calculator) are removed and the other part is remained. Such the architecture may realize the methods of training the speech recognition model provided by the examples of the present disclosure. The training process is as follows.

(1) The speech data in a training sample is inputted into the HuBERT model, and the HuBERT model converts the speech data and outputs an embedding. The embedding data is inputted into the codebook quantization model. The codebook quantization model converts the embedding into quantized codebook data, and obtains a joint optimal result of multiple categories. In addition, the quantized codebook data is inputted into the JCL/CE calculator.

(2) The speech data in the training sample is inputted into the speech recognition model. The preprocessor in the speech recognition model processes the above speech data and then inputs it into the encoder. The encoder outputs the encoded data (which may be regarded as an embedding whose parameter number is smaller than that of the embedding outputted by the teacher model). The encoded data is inputted into the JCL/CE calculator and the joiner.

Thus, the JCL/CE calculator may calculate a JCL loss or a CE loss and compare it with the corresponding threshold. The loss meets a requirement when it is less than or equal to the threshold and does not meet the requirement when it is greater than the threshold.

(3) The text data in the training sample is inputted into the predictor of the speech recognition model. The predictor outputs predicted category data and outputs to the joiner. The joiner may join the encoded data and the preset category data and output them into the RNN-T loss function value calculator, and the RNN-T loss function calculator calculates the RNN-T loss. When the RNN-T loss is less than or equal to the RNN-T loss threshold, it is determined to meet a requirement; when the RNN-T loss is greater than the RNN-T loss threshold, it is determined that the requirement is not met.

(4) When both the L1/L2/KLD calculator and the RNN-T loss function value calculator meet the requirements and/or the iteration times reaches a preset times threshold, it is determined that the training of the speech recognition model is completed; otherwise, it continues to input training samples and keep training until the training is complete. In this way, such the training method can achieve obtaining multiple categories through one piece of training.

By comparing the first training mode and the second training mode above, in the first training mode, the embedding outputted by the teacher model needs to be used during calculating the L1/L2/KLD loss. Thus, a greater computing power is required to support larger calculations due to the higher dimension of the embedding, or a larger storage space is required due to the higher dimension and the floating-point type of the embedding. In the second training mode, the quantized codebook data (codebook index, CI) is used during calculating the JCL/CE loss. Combined with the training process of the codebook quantization model, it can be seen that the calculations for the JCL/CE loss is less and the greater computing power is unnecessary because the quantized codebook data is of integer type and has a lower dimension, or the storage space occupied by the quantized codebook data is less. Under the same conditions (such as the training samples with the same speech, the same frame rate, the same time step, etc.), the training efficiency in the second training mode is 4.5 times higher than that in the first training mode, with only $1/320$ storage space being required. In addition, in the examples of the present disclosure, the data distribution may be automatically fitted by a neural network, which is insensitive to noise of the inputted data. The reason is that, during training the codebook quantization model, the RRL is adopted for each training sample, so that the reconstructed embedding is as similar as possible to the inputted embedding.

Figure 13:
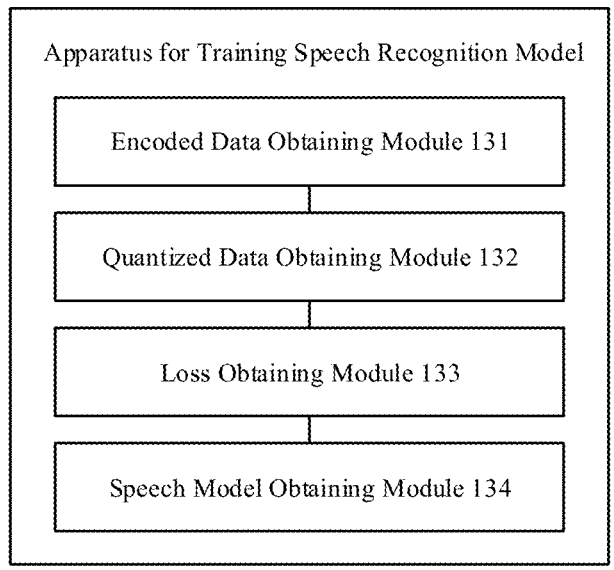
FIG. 13 illustrates a block diagram of an apparatus for training a speech recognition model according to an example.

On the basis of the methods of training a speech recognition model provided by the examples of the present disclosure, an example of the present disclosure also provides an apparatus for training a speech recognition model, as illustrated in FIG. 13, including:

an encoded data obtaining module 131 that is configured to input speech data of each of a plurality of training samples into a teacher model and a to-be-trained speech recognition model separately, and obtain an embedding outputted by the teacher model and encoded data outputted by the to-be-trained speech recognition model, where the embedding includes a floating-point vector holding D floating-point numbers;

a quantized data obtaining module 132 that configured to obtain quantized codebook data by performing a multi-codebook quantization on the embedding, where the quantized codebook data includes N integers corresponding to the speech data and each integer indicates a codebook index;

a loss obtaining module 133 that is configured to calculate a loss based on the encoded data, the quantized codebook data, and text data in the training sample;

a speech model obtaining module 134 that is configured to obtain a trained speech recognition model by stopping training the to-be-trained speech recognition model when the loss is less than or equal to a preset loss threshold and/or trained times is greater than preset trained times.

In one example, the quantized data obtaining module 132 includes:

a first data obtaining submodule that is configured to convert the embedding into first intermediate data, where the first intermediate data includes N*C integers, with N indicating a number of codebooks, and C indicating a number of categories in each codebook;

a second data obtaining submodule that is configured to obtain codebook indexes including N integers as second intermediate data by taking a maximum value of each category in the N codebooks of the first intermediate data; and a quantized data obtaining submodule that is configured to obtain the quantized codebook data corresponding to a smallest RRL by iterating over the second intermediate data.

In one example, the quantized data obtaining submodule includes:

a first iteration unit that is configured for a first iteration process, which includes: combining the N codebooks of the first intermediate data in pairs to obtain $N/2^1$ Level-1 codebook combinations, where each Level-1 codebook combination includes C*C Level-1 element combinations, and each Level-1 element combination includes $2^1$ members; for each Level-1 codebook combination, obtaining an RRL of each Level-1 element combination (i.e., C*C RRLs in total) and the initial codebook indexes of the remaining codebooks in the second intermediate data; and for each Level-1 codebook combination, taking L Level-1 element combinations corresponding to the smallest L RRLs of the C*C RRLs as the elements of the Level-1 codebook combination;

an i-th iteration unit that is configured for an i-th iteration process, which includes: combining Level-(i−1) codebook combinations in pairs to obtain $N/2^i$ Level-i codebook combinations, where each Level-i codebook combination includes L*L Level-i element combinations, and each Level-i element combination includes $2^i$ members; for each Level-i codebook combination, obtaining an RRL of each Level-i element combination (i.e., L*L RRLs in total) and the initial codebook indexes of the remaining codebooks in the second intermediate data; and for each Level-i codebook combination, taking L Level-i element combinations corresponding to the smallest L RRLs of the L*L RRLs as the elements of the Level-i codebook combinations, where i is 1 to K−1, K indicates a total iteration number, and $2^K$ is equal to N; and an K-th iteration unit that is configured for a K-th iteration process, which includes: combining Level-(K−1) codebook combinations in pairs to obtain a Level-K codebook combination, where the Level-K codebook combination includes L*L Level-K element combinations, and each Level-K element combination includes $2^K$ members; obtaining an RRL of each Level-K element combination in the Level-K codebook combination; and taking the Level-K element combination with the smallest RRL as the quantized codebook data.

In one example, the quantized data obtaining submodule includes:

a quantized data obtaining unit that is configured to input the embedding into a codebook quantization model that is trained in advance, and obtain the quantized codebook data corresponding to a smallest RRL outputted by the codebook quantization model after performing the multi-codebook quantization on the embedding.

In one example, the apparatus includes a quantization model training module, which includes:
- a data obtaining submodule that is configured to obtain the quantized codebook data and the first intermediate data outputted by the codebook quantization model by inputting an embedding sample into the codebook quantization model;
- a data reconstructing submodule that is configured to obtain a reconstructed embedding outputted by a quantized-data reconstruction model by inputting the quantized codebook data into the quantized-data reconstruction model;
- a loss calculating submodule that is configured to calculate an RRL based on the embedding sample and the reconstructed embedding, a uniform distribution loss based on the first intermediate data, and a consistency loss based on the first intermediate data and the quantized codebook data; and
- a quantization model determining submodule that is configured to complete training the codebook quantization model when each of the RRL, the uniform distribution loss and the consistency loss meet a requirement and/or an iteration times meets a preset times threshold.

In one embodiment, the loss calculating submodule includes:
- a first sum obtaining unit that is configured to obtain first square values of differences between the embedding sample and the reconstructed embedding, and obtain a sum of the first square values;
- a second sum obtaining unit that is configured to obtain second square values of differences between the embedding sample and a mean value of the embedding sample, and obtain a sum of the second square values; and
- a loss obtaining unit that is configured to obtain the RRL by obtaining a ratio of the sum of the first square values to the sum of the second square values.

In one embodiment, the loss calculating submodule includes:
- a product obtaining unit that is configured to obtain a product of a predicted distribution probability of each category in each codebook and a logarithm of the predicted distribution probability;
- a first sum obtaining unit that is configured to obtain a first sum of the products corresponding to all categories in each codebook;
- a second sum obtaining unit that is configured to obtain a second sum of the first sums corresponding to all the codebooks; and
- a loss obtaining unit that is configured to obtain the uniform distribution loss by calculating a mean value of the second sum.

In one example, the loss calculating submodule includes:
- a logarithm obtaining unit that is configured to obtain a predicted probability of each category in each iterated codebook, and obtain a logarithm of the predicted probability;
- a loss obtaining unit that is configured to for the logarithms corresponding to all the codebooks, obtain a sum of the logarithms and an inverse of a mean value of the logarithms, and take the inverse of the mean value as the consistency loss.

In one example, the loss includes a categorical cross entropy, and the loss obtaining module includes:
- a category probability obtaining submodule that is configured to obtain a probability of each category in each codebook of the encoded data after a conversion;
- a sum obtaining submodule that is configured to obtain a logarithm of each probability in each codebook, and calculate a sum of the logarithms of all the codebooks; and
- a cross entropy obtaining submodule that is configured to calculate a mean value of the sum, and take an inverse of the mean value as the categorical cross entropy.

In one example, the loss includes an RNN-T loss function value, and the loss obtaining module includes:
- an alignment probability obtaining submodule that is configured to obtain a probability of each alignment scheme as enumerating alignment schemes between the speech data and the text data; and
- a loss obtaining submodule that is configured to obtain a sum of the probabilities corresponding to all the alignment schemes as the RNN-T loss function value.

It should be noted that the apparatus illustrated in the examples matches and may make reference to the contents of the method examples, so that the details are not repeated here.

Figure 14:
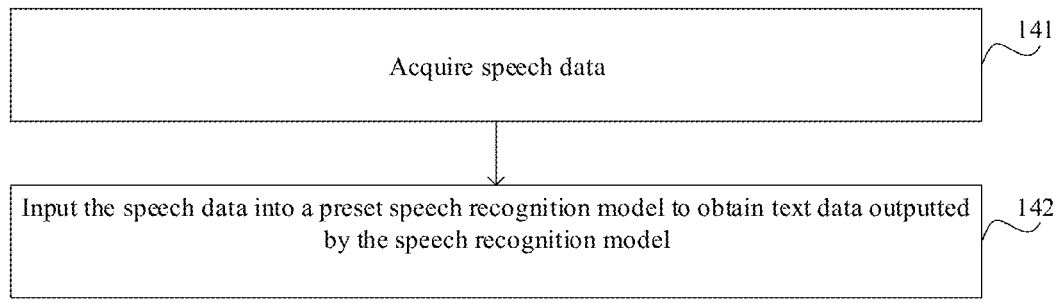
FIG. 14 illustrates a flowchart of a speech recognition method according to an example.

An example of the present disclosure further provides a speech recognition method, as illustrated in FIG. 14, being applicable to an electronic device and including steps 141-142.

At step 141, the electronic device may acquire speech data.

At step 142, the electronic device may input the speech data into a preset speech recognition model to obtain text data outputted by the speech recognition model. The speech recognition model is trained and implemented by adopting the training methods described in FIG. 1 to FIG. 12.

Figure 15:
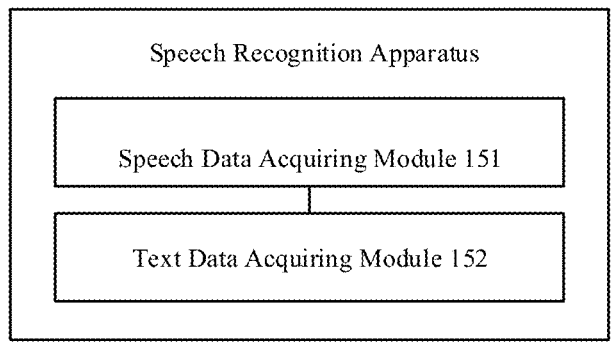
FIG. 15 illustrates a block diagram of a speech recognition apparatus according to an example.

An example of the present disclosure also provides a speech recognition apparatus, as illustrated in FIG. 15, being applicable to an electronic device and including:
- a speech data acquiring module 151 that is configured to acquire speech data; and
- a text data acquiring module 152 that is configured to input the speech data into a preset speech recognition model and obtain text data outputted by the speech recognition model. The speech recognition model adopts the training methods described in FIG. 1 to FIG. 12.

Figure 16:
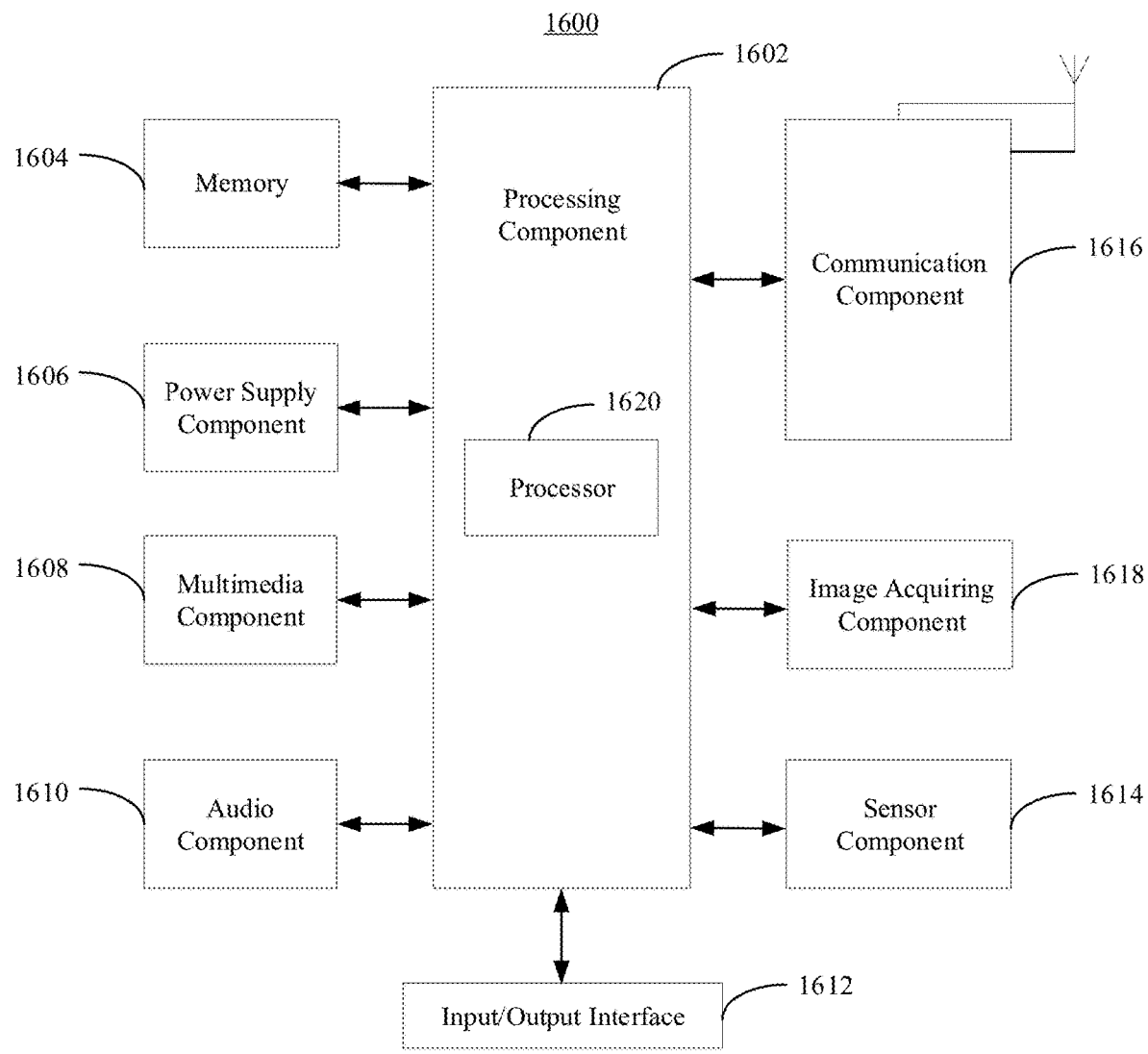
FIG. 16 is a block diagram of various processing nodes according to an example.

FIG. 16 is a block diagram of an electronic device according to an example. For example, the electronic device 1600 may be a smart phone, a computer, a digital broadcasting terminal, a tablet device, a medical device, a fitness device, a personal digital assistant, and the like.

As illustrated in FIG. 16, the electronic device 1600 may include one or more of the following components: a processing component 1602, a memory 1604, a power supply component 1606, a multimedia component 1608, an audio component 1610, an input/output (I/O) interface 1612, a sensor component 1614, communication component 1616 and an image acquiring component 1618.

The processing component 1602 generally controls the overall operations of the electronic device 1600, such as operations associated with display, phone calls, data communications, camera operations, and recording operations. The processing component 1602 may include one or more processors 1620 to execute computer programs. In addition, the processing component 1602 may include one or more modules which facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operations of the electronic device 1600. Examples of such data include computer programs for any application or method operated on the electronic device 1600, contact data, phonebook data, messages, pictures, videos, and the like. The memory 1604 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 1606 provides power for various components of the electronic device 1600. The power supply component 1606 may include a power management system, one or more power supplies, and other components associated with generating, managing, and distributing power for the electronic device 1600. The power supply component 1606 may include a power supply chip. A controller may communicate with the power supply chip and thus control the power supply chip to turn on or turn off a switch element, so that a battery is to supply power to a mainboard circuit or not.

The multimedia component 1608 includes a screen providing an output interface between the electronic device 1600 and a target object. In some examples, the screen may include a liquid crystal display (LCD) and a touch panel (TP). If the screen includes the TP, the screen may be implemented as a touch screen to receive input signals from the target object. The TP may include one or more touch sensors to sense touches, swipes, and gestures on the TP. The touch sensors may not only sense a boundary of a touch or swipe, but also sense a lasting time and a pressure associated with the touch or swipe.

The audio component 1610 is configured to output and/or input audio information. For example, the audio component 1610 includes a microphone (MIC) that is configured to receive external audio information when the electronic device 1600 is in an operating mode, such as a call mode, a recording mode, and a voice recognition mode. The received audio information may be further stored in memory 1604 or transmitted via communication component 1616. In some examples, the audio component 1610 also includes a speaker for outputting audio information.

The I/O interface 1612 provides an interface between the processing component 1602 and a peripheral interface module. The above peripheral interface module may be a keyboard, a click wheel, buttons, or the like.

The sensor component 1614 includes one or more sensors to provide the electronic device 1600 with status assessments in various aspects. For example, the sensor component 1614 may detect an open/closed state of the electronic device 1600 and a relative positioning of components such as the display and keypad of the electronic device 1600, and the sensor component 1614 may also detect a change in position of the electronic device 1600 or a component of the electronic device 1600, the presence or absence of the target object contacting with the electronic device 1600, orientation or acceleration/deceleration of the electronic device 1600, and temperature change of the electronic device 1600. In the example, the sensor component 1614 may include a magnetic sensor, a gyro sensor, and a magnetic field sensor. The magnetic field sensor includes at least one of a Hall sensor, a thin film magnetoresistive sensor, or a magnetic liquid acceleration sensor.

The communication component 1616 is configured to facilitate wired or wireless communication between the electronic device 1600 and other devices. The electronic device 1600 may access a wireless network based on a communication standard, such as WiFi, 2G, 3G, 4G, 5G, or a combination thereof. In one example, the communication component 1616 receives broadcast information or broadcast related information from an external broadcast management system via a broadcast channel. In an example, the communication component 1616 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the electronic device 1600 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronics.

In an example, a non-transitory computer-readable storage medium, such as a memory 1604 including instructions, is also provided. The executable computer program described above may be executed by one or more processors. The readable storage medium may be ROM, random access memory (RAM), CD-ROM, magnetic tape, floppy disk, optical data storage device, and the like.

The solutions provided by the embodiments of the present disclosure may obtain the following beneficial effects.

In the solutions provided by the above embodiments of the present disclosure, speech data of each of a plurality of training samples is inputted into a teacher model and a to-be-trained speech recognition model separately, and an embedding outputted by the teacher model and encoded data outputted by the to-be-trained speech recognition model are obtained, where the embedding includes a floating-point vector holding D floating-point numbers. Then, quantized codebook data is obtained by performing a multi-codebook quantization on the embedding, where the quantized codebook data includes N integers corresponding to the speech data and each integer indicates a codebook index. Thereafter, a loss is calculated based on the encoded data, the quantized codebook data, and text data in the training sample. At last, a trained speech recognition model is obtained by stopping training the to-be-trained speech recognition model when the loss is less than or equal to a preset loss threshold and/or trained times is greater than preset trained times. Through converting the embedding into the quantized codebook data of integer type in the embodiments, the required storage space is greatly reduced. Alternatively, through adopting the quantized codebook data instead of dynamically generating and directly applying the embedding, the required computing power can be reduced, so that an electronic device is not required to have larger storage space or higher computing power, thereby reducing the cost.

Other implementations of the present disclosure will be readily apparent to those skilled in the art after implementing the disclosure by making reference to the specification. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the true scope and spirit of the present disclosure are set forth in the appended claims. It should be understood that the present disclosure is not limited to the above-described accurate structures illustrated in the drawings, and various modifications and changes can be made to the present disclosure without departing from the scope thereof. The scope of the present disclosure is to be limited only by the appended claims.

The invention claimed is:

1. A method of training a speech recognition model, comprising:
for each of a plurality of training samples,
inputting speech data of a training sample into a teacher model and a to-be-trained speech recognition model separately,
obtaining an embedding outputted by the teacher model and encoded data outputted by the to-be-trained speech recognition model, wherein the embedding comprises a floating-point vector holding D floating-point numbers,
obtaining quantized codebook data by performing a multi-codebook quantization on the embedding, wherein the quantized codebook data comprises N integers corresponding to the speech data and each integer indicates a codebook index, wherein N is a positive integer,
calculating a loss based on the encoded data, the quantized codebook data, and text data in the training sample, and
obtaining a trained speech recognition model by stopping training the to-be-trained speech recognition model in response to determining at least one of followings: the loss being less than or equal to a preset loss threshold, or trained times being greater than preset trained times.

2. The method according to claim 1, wherein obtaining the quantized codebook data by performing the multi-codebook quantization on the embedding comprises:
converting the embedding into first intermediate data, wherein the first intermediate data comprises N*C integers, wherein N indicates a number of codebooks, and C indicates a number of categories in each codebook;
obtaining initial codebook indexes comprising N integers as second intermediate data by taking a maximum value of each category in N codebooks of the first intermediate data; and
obtaining the quantized codebook data corresponding to a smallest relative reconstruction loss (RRL) by iterating over the second intermediate data.

3. The method according to claim 2, wherein obtaining the quantized codebook data corresponding to the smallest RRL by iterating over the second intermediate data comprises an i-th iteration process, wherein i is an integer from 1 to K, K indicates a total iteration number, and $2^K$ is equal to N;
wherein in response to determining that i is equal to 1, a first iteration process comprises:
combining the N codebooks of the first intermediate data in pairs to obtain $N/2^1$ Level-1 codebook combinations, wherein each Level-1 codebook combination comprises C*C Level-1 element combinations, and each Level-1 element combination comprises $2^1$ members;
for each Level-1 codebook combination, obtaining an RRL of each Level-1 element combination and the initial codebook indexes of remaining codebooks in the second intermediate data; and for each Level-1 codebook combination, taking L Level-1 element combinations corresponding to smallest L RRLs as elements of the Level-1 codebook combination;
wherein in response to determining that i is an integer between 1 and K, the i-th iteration process comprises:
combining Level-(i−1) codebook combinations in pairs to obtain $N/2^i$ Level-i codebook combinations, wherein each Level-i codebook combination comprises L*L Level-i element combinations, and each Level-i element combination comprises $2^i$ members;
for each Level-i codebook combination, obtaining an RRL of each Level-i element combination and the initial codebook indexes of the remaining codebooks in the second intermediate data; and
for each Level-i codebook combination, taking L Level-i element combinations corresponding to smallest L RRLs as elements of the Level-i codebook combination; and
wherein in response to determining that i is equal to K, a K-th iteration process comprises:
combining Level-(K−1) codebook combinations in pairs to obtain a Level-K codebook combination, wherein the Level-K codebook combination comprises L*L Level-K element combinations, and each Level-K element combination comprises $2^K$ members;
obtaining an RRL of each Level-K element combination in the Level-K codebook combination; and
taking the Level-K element combination with a smallest RRL as the quantized codebook data.

4. The method according to claim 1, further comprising:
inputting the embedding into a codebook quantization model that is trained in advance, and
obtaining the quantized codebook data corresponding to a smallest relative reconstruction loss (RRL) outputted by the codebook quantization model after performing the multi-codebook quantization on the embedding.

5. The method according to claim 4, wherein the codebook quantization model is trained by:
obtaining the quantized codebook data and a first intermediate data outputted by the codebook quantization model by inputting an embedding sample into the codebook quantization model;
obtaining a reconstructed embedding outputted by a quantized-data reconstruction model by inputting the quantized codebook data into the quantized-data reconstruction model;
calculating an RRL based on the embedding sample and the reconstructed embedding, a uniform distribution loss based on the first intermediate data, and a consistency loss based on the first intermediate data and the quantized codebook data; and
completing training the codebook quantization model in response to determining at least one of followings: each of the RRL, the uniform distribution loss and the consistency loss meeting a requirement, or iteration times meeting a preset times threshold.

6. The method according to claim 5, wherein calculating the RRL based on the embedding sample and the reconstructed embedding comprises:
obtaining first square values of differences between the embedding sample and the reconstructed embedding;
obtaining a sum of the first square values;
obtaining second square values of differences between the embedding sample and a mean value of the embedding sample;

obtaining a sum of the second square values; and
obtaining the RRL by obtaining a ratio of the sum of the first square values to the sum of the second square values.

7. The method according to claim 5, wherein calculating the uniform distribution loss based on the first intermediate data comprises:
obtaining a product of a predicted distribution probability of each category in each codebook and a logarithm of the predicted distribution probability;
obtaining a first sum of products corresponding to all categories in each codebook;
obtaining a second sum of first sums corresponding to all codebooks; and
obtaining the uniform distribution loss by calculating a mean value of the second sum.

8. The method according to claim 5, wherein calculating the consistency loss based on the first intermediate data and the quantized codebook data comprises:
obtaining a predicted probability of each category in each iterated codebook;
obtaining a logarithm of the predicted probability;
for logarithms corresponding to all codebooks, obtaining a sum of the logarithms and an inverse of a mean value of the logarithms; and
taking the inverse of the mean value as the consistency loss.

9. The method according to claim 1, wherein the loss comprises a categorical cross entropy, and calculating the loss based on the encoded data, the quantized codebook data and the text data in the training sample comprises:
obtaining a probability of each category in each codebook of the encoded data after a conversion;
obtaining a logarithm of each probability in each codebook;
calculating a sum of logarithms of all codebooks;
calculating a mean value of the sum; and
taking an inverse of the mean value as the categorical cross entropy.

10. The method according to claim 1, wherein the loss comprises a Recurrent Neural Network Transducer (RNN-T) loss function value, and calculating the loss based on the encoded data, the quantized codebook data and the text data in the training sample comprises:
obtaining a probability of each alignment scheme as enumerating alignment schemes between the speech data and the text data; and
obtaining a sum of probabilities corresponding to all the enumerating alignment schemes as the RNN-T loss function value.

11. A speech recognition method, comprising:
acquiring speech data;
inputting the speech data into a preset speech recognition model; and
obtaining text data outputted by the speech recognition model;
wherein the speech recognition model is trained and implemented by adopting the training method according to claim 1.

12. An electronic device, comprising:
a memory and one or more processors;
wherein the memory is configured to store a computer program executable by the one or more processors; and
wherein the one or more processors are configured to execute the computer program in the memory to implement acts comprising:
for each of a plurality of training samples,
inputting speech data of a training sample into a teacher model and a to-be-trained speech recognition model separately,
obtaining an embedding outputted by the teacher model and encoded data outputted by the to-be-trained speech recognition model, wherein the embedding comprises a floating-point vector holding D floating-point numbers,
obtaining quantized codebook data by performing a multi-codebook quantization on the embedding, wherein the quantized codebook data comprises N integers corresponding to the speech data and each integer indicates a codebook index, wherein N is a positive integer,
calculating a loss based on the encoded data, the quantized codebook data, and text data in the training sample, and
obtaining a trained speech recognition model by stopping training the to-be-trained speech recognition model in response to determining at least one of followings: the loss being less than or equal to a preset loss threshold, or trained times being greater than preset trained times.

13. The electronic device according to claim 12, wherein the one or more processors, when obtaining the quantized codebook data by performing the multi-codebook quantization on the embedding, are further configured to implement:
converting the embedding into first intermediate data, wherein the first intermediate data comprises N*C integers, wherein N indicates a number of codebooks, and C indicates a number of categories in each codebook;
obtaining initial codebook indexes comprising N integers as second intermediate data by taking a maximum value of each category in N codebooks of the first intermediate data; and
obtaining the quantized codebook data corresponding to a smallest relative reconstruction loss (RRL) by iterating over the second intermediate data.

14. The electronic device according to claim 13, wherein the one or more processors, when obtaining the quantized codebook data corresponding to the smallest RRL by iterating over the second intermediate data, are further configured to implement an i-th iteration process, wherein i is an integer from 1 to K, K indicates a total iteration number, and $2^K$ is equal to N;
wherein in response to determining that i is equal to 1, a first iteration process comprises:
combining the N codebooks of the first intermediate data in pairs to obtain $N/2^1$ Level-1 codebook combinations, wherein each Level-1 codebook combination comprises C*C Level-1 element combinations, and each Level-1 element combination comprises $2^1$ members;
for each Level-1 codebook combination, obtaining an RRL of each Level-1 element combination and the initial codebook indexes of remaining codebooks in the second intermediate data; and
for each Level-1 codebook combination, taking L Level-1 element combinations corresponding to smallest L RRLs as elements of the Level-1 codebook combination;
wherein in response to determining that i is an integer between 1 and K, the i-th iteration process comprises:
combining Level-(i−1) codebook combinations in pairs to obtain $N/2^i$ Level-i codebook combinations, wherein each Level-i codebook combination comprises L*L Level-i element combinations, and each Level-i element combination comprises $2^i$ members;

for each Level-i codebook combination, obtaining an RRL of each Level-i element combination and the initial codebook indexes of remaining codebooks in the second intermediate data; and for each Level-i codebook combination, taking L Level-i element combinations corresponding to smallest L RRLs as elements of the Level-i codebook combination; and wherein in response to determining that i is equal to K, the K-th iteration process comprises:

combining Level-(K-1) codebook combinations in pairs to obtain a Level-K codebook combination, wherein the Level-K codebook combination comprises L*L Level-K element combinations, and each Level-K element combination comprises $2^K$ members;

obtaining an RRL of each Level-K element combination in the Level-K codebook combination; and taking the Level-K element combination with a smallest RRL as the quantized codebook data.

15. The electronic device according to claim 12, wherein the one or more processors are further configured to implement:

inputting the embedding into a codebook quantization model that is trained in advance, and obtaining the quantized codebook data corresponding to a smallest relative reconstruction loss (RRL) outputted by the codebook quantization model after performing the multi-codebook quantization on the embedding.

16. The electronic device according to claim 15, wherein the one or more processors are further configured to train the codebook quantization model, comprising:

obtaining the quantized codebook data and a first intermediate data outputted by the codebook quantization model by inputting an embedding sample into the codebook quantization model;

obtaining a reconstructed embedding outputted by a quantized-data reconstruction model by inputting the quantized codebook data into the quantized-data reconstruction model;

calculating an RRL based on the embedding sample and the reconstructed embedding, a uniform distribution loss based on the first intermediate data, and a consistency loss based on the first intermediate data and the quantized codebook data; and completing training the codebook quantization model in response to determining at least one of followings: each of the RRL, the uniform distribution loss and the consistency loss meeting a requirement, or iteration times meeting a preset times threshold.

17. The electronic device according to claim 12, wherein the loss comprises a categorical cross entropy, and the one or more processors, when calculating the loss based on the encoded data, the quantized codebook data and the text data in the training sample, are further configured to implement acts comprising:

obtaining a probability of each category in each codebook of the encoded data after a conversion;

obtaining a logarithm of each probability in each codebook;

calculating a sum of logarithms of all codebooks;

calculating a mean value of the sum; and taking an inverse of the mean value as the categorical cross entropy.

18. The electronic device according to claim 12, wherein the loss comprises a Recurrent Neural Network Transducer (RNN-T) loss function value, and the one or more processors, when calculating the loss based on the encoded data, the quantized codebook data and the text data in the training sample, are further configured to implement acts comprising:

obtaining a probability of each alignment scheme as enumerating alignment schemes between the speech data and the text data; and obtaining a sum of probabilities corresponding to all the enumerating alignment schemes as the RNN-T loss function value.

19. A speech recognition device, comprising:

a memory and one or more processors;

wherein the memory is configured to store a computer program executable by the one or more processors; and wherein the one or more processors are configured to execute the computer program in the memory to implement acts comprising:

acquiring speech data;

inputting the speech data into a preset speech recognition model; and obtaining text data outputted by the speech recognition model;

wherein the speech recognition model is trained and implemented by adopting the training method according to claim 1.

20. A non-transitory computer-readable storage medium, wherein an executable computer program in the storage medium, when being executed by one or more processors, implements the method according to claim 1.

* * * * *